United States Patent [19]

Lauer et al.

[11] Patent Number: 5,289,538
[45] Date of Patent: Feb. 22, 1994

[54] CIRCUIT ARRANGEMENT FOR SIGNAL AND INFORMATION CONVERSION BETWEEN ANALOG JUNCTION LINES AND DIGITAL TERMINAL DEVICES IN COMMUNICATIONS EXCHANGES

[75] Inventors: Walter Lauer, Frankfurt-Höchst; Udo Petri, Taunusstein; Gerd Pönitz, Dietzenbach, all of Fed. Rep. of Germany

[73] Assignee: Telenorma GmbH, Frankfurt am Main, Fed. Rep. of Germany

[21] Appl. No.: 669,487

[22] Filed: Mar. 14, 1991

[30] Foreign Application Priority Data

Mar. 16, 1990 [DE] Fed. Rep. of Germany ....... 4008450

[51] Int. Cl.$^5$ ............................................. H04M 3/00
[52] U.S. Cl. .................................... 379/402; 379/399; 379/339
[58] Field of Search ............... 379/399, 402, 338, 339, 379/344, 345

[56] References Cited

U.S. PATENT DOCUMENTS

| | | | |
|---|---|---|---|
| 4,110,560 | 8/1978 | Leary et al. | 379/339 |
| 4,270,027 | 5/1981 | Agrawal et al. | 379/339 |
| 4,456,991 | 6/1984 | Chea, Jr. et al. | 379/339 X |
| 4,759,059 | 7/1988 | Christensen | 379/399 X |
| 4,852,160 | 7/1989 | Kiko et al. | 379/399 X |
| 4,894,864 | 1/1990 | Cook | 379/399 X |
| 5,133,006 | 7/1992 | Khuat | 379/399 |
| 5,151,936 | 9/1992 | Riedle | 379/402 X |

FOREIGN PATENT DOCUMENTS 2919617 11/1980 Fed. Rep. of Germany.
3014572 10/1981 Fed. Rep. of Germany.

*Primary Examiner*—James L. Dwyer
*Assistant Examiner*—M. Shehata
*Attorney, Agent, or Firm*—Eckert Seamans Cherin & Mellott

[57] ABSTRACT

A circuit arrangement converts signals and information between analog junction lines and digital terminal devices in communications exchanges. A decentralized control device is provided in order to process and pass on switching criteria and codes received and sent to the respective analog junction line, inside and outside the audio frequency band, the circuit arrangement including a plurality of line interfaces, each coupled directly to a respective one of the decentralized control devices, for the switching criteria and codes to be exchanged outside of the audio frequency. At least one digital signal processor is provided for processing the codes to be exchanged within the audio frequency band, the digital signal processor being looped in via a hybrid connection and converter in a speech path which cooperates with the control device. A digital terminal interface is responsive to the control device and the signal processor, the digital terminal interface being modulated by the control device and the signal processor to provide a plurality of useful channels and at least one signaling channel.

5 Claims, 1 Drawing Sheet

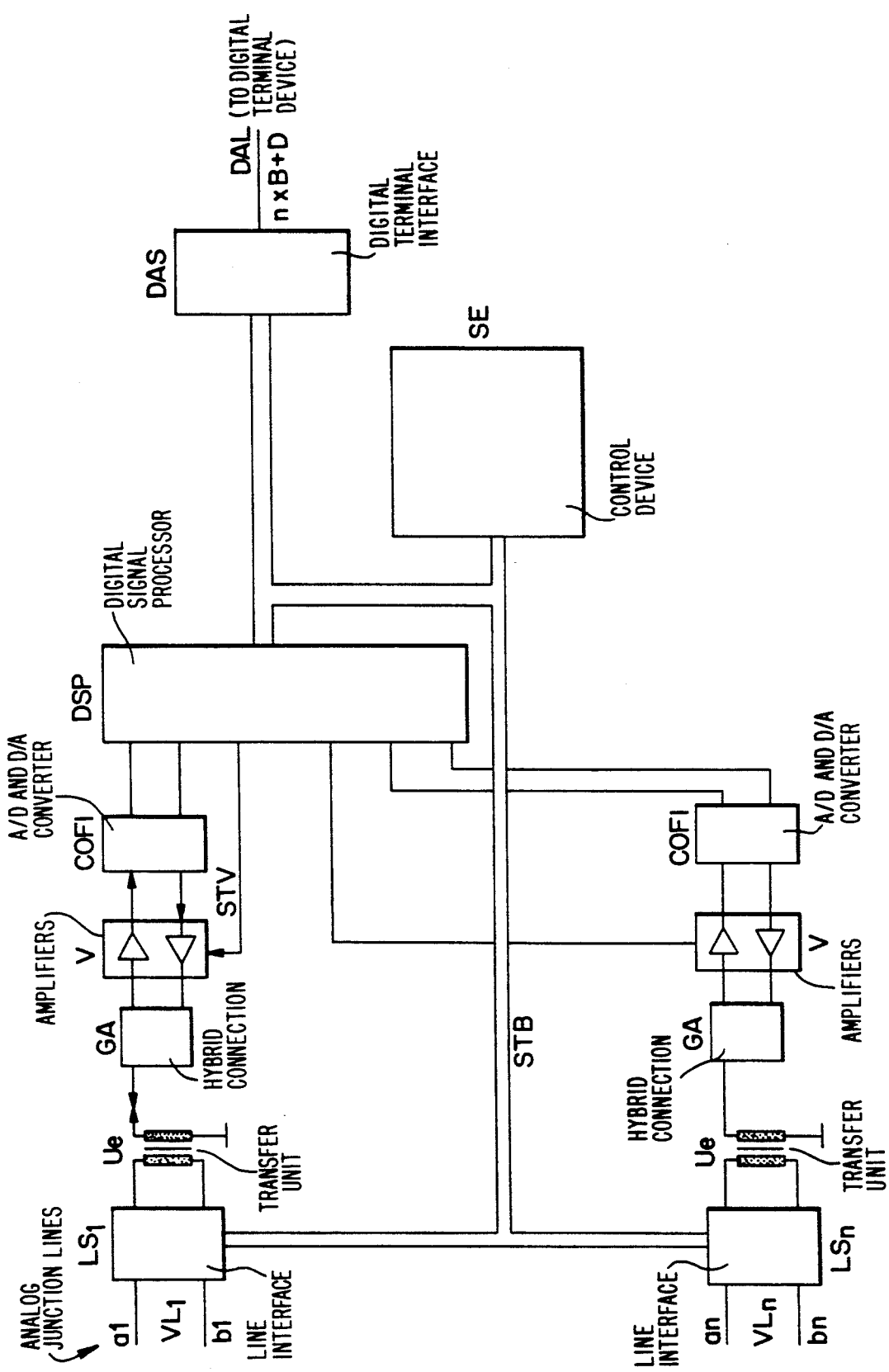

CIRCUIT ARRANGEMENT FOR SIGNAL AND INFORMATION CONVERSION BETWEEN ANALOG JUNCTION LINES AND DIGITAL TERMINAL DEVICES IN COMMUNICATIONS EXCHANGES

BACKGROUND OF THE INVENTION

1. Field of the Invention

The invention pertains to a circuit arrangement for signal and information conversion between analog junction lines and digital terminal devices in communications exchanges. In particular the invention concerns an arrangement wherein decentralized control devices are provided in order to process and pass on switching criteria and codes received and sent to the analog junction line, both inside and outside of the audio frequency band.

2. Prior Art

A process for controlling switching codes and switching states on junction lines is known from DE 29 19 617 - Poehlchen (Nov. 20, 1980). The document discloses a decentralized control which serves several junction lines and controls switching codes lying outside the audio frequency band. The switching codes are received and transmitted via the junction line. This peripheral control device works with a scanning device and memory in which junction states and properties of the respective junction lines are stored in each case. The control of audio signals to be transmitted and the evaluation of audio frequencies received cannot be performed by such a control device.

DE 30 14 572 - Burkart et al (Oct. 29, 1981) discloses a circuit arrangement for transmitting low-frequency signals on junction lines in telephone exchanges. Matrix-like coupling components are provided with which centrally generated signals lying within the audio frequency band are switched onto the junction line. A decentralized control is provided in each case for this purpose which serves several communications lines. Switching codes lying outside the audio frequency band cannot be controlled with this circuit arrangement.

SUMMARY OF THE INVENTION

It is an object of the present invention to devise a circuit arrangement with which all signals, codes and useful information received and transmitted on a junction line can be converted by a single decentralized control device in such a way that an analog junction line can be connected to a digital terminal device.

This object is achieved according to the invention by a circuit arrangement for conversion of signals and information between analog junction lines and digital terminal devices in communications exchanges, wherein decentralized control devices are provided in order to process and pass on switching criteria and codes received and sent to the respective analog junction line, inside and outside the audio frequency band, the circuit arrangement including a plurality of line interfaces, each coupled directly to a respective one of the decentralized control devices, for the switching criteria and codes to be exchanged outside of the audio frequency. At least one digital signal processor is provided for processing the codes to be exchanged within the audio frequency band, the digital signal processor being looped in via a hybrid connection and converter in a speech path which cooperates with the control device. A digital terminal interface is responsive to the control device and the signal processor, the digital terminal interface being modulated by the control device and the signal processor to provide a plurality of useful channels and at least one signaling channel.

All signals, codes and useful information received and transmitted on an analog junction line are capable of being transformed by a single decentralized control device in such a way that this junction line can be connected to a digital terminal device. In this case, codes and signals both outside the audio frequency band and also inside the audio frequency band can be converted in both directions.

For switching criteria and codes to be exchanged outside the audio frequency band, line interfaces are provided which are connected directly to the competent decentralized control device. A digital signal processor is looped into the speech path via a hybrid connection and converter circuits and operates in cooperation with the control device. The control device, with the aid of the signal processor, modulates a digital terminal interface in such a way that the useful channels and the at least one signaling channel are formed.

According to the invention, exchanges of different operating types can be coupled to one another. An analog junction line can be coupled to a digitally operated terminal device, and a digitally operated junction line, in the case of the appropriate design of the circuit arrangement, can also be coupled to an analog-operated terminal device. Since the decentralized control device and the signal processor are capable of serving only a few lines in each case, individual adaptations can be provided such as are optimal for the type of line in question. With these features, communications exchanges of different operating modes can be connected with one another in an advantageous manner.

BRIEF DESCRIPTION OF THE DRAWING

The invention is discussed herein with reference to a preferred exemplary embodiment, as well as recommended variations and modifications. It should be understood that a range of such variations and modifications are possible within the scope and spirit of the invention.

In the drawing, FIG. 1 is a schematic block diagram illustrating the elements of the invention.

DETAILED DESCRIPTION OF THE PREFERRED EMBODIMENTS

As shown in FIG. 1, a plurality of analog junction lines $VL_l$ through $VL_n$ are to be operatively coupled through the circuit arrangement of the invention to one or more terminal devices along channel DAL, which includes a plurality of useful channels B and a signalling channel D. The analog junction lines $VL_l$ through $VL_n$ are coupled via their lines $a_1/b_1$ through $a_n/b_n$, respectively, through line interfaces $LS_l$, $LS_n$ and are terminated by coupling transformer or transfer units Ue, leading to hybrid connections GA. The line interfaces LS are coupled via a control line bundle STB directly with a peripheral control device SE, which is capable of serving a plurality of the junction lines. Transmitting and receiving devices for all signals and codes which are to be exchanged outside of the audio frequency band are disposed in the line interfaces LS. These signals and codes can include direct current signals, i.e. the making and breaking of direct current loops or the switching on and off of DC voltages, and also lower frequency AC signals which serve as call up and/or occupancy signals.

The voice or low frequency channel in each case is coupled from the transfer unit Ue to a hybrid connection GA and runs through a bidirectional amplifier arrangement V to converter circuits COFI. The converter COFI is also bidirectional, and includes means for providing an analog to digital conversion or a digital to analog conversion of the audio signals, in a known manner. A corresponding transformation also takes place with respect to signaling codes which are transmitted and received as tones via the respective junction line VL. The digital inputs and outputs of the converter circuits COFI are coupled to corresponding outputs and inputs of a digital signal processor DSP.

A common control line bundle STB connects the digital signal processor DSP with the control device SE, the line interface LS and a digital terminal interface DAS. A digital connecting line DAL leads from the digital terminal interface to a terminal device (not shown). This digital connecting line DAL may be very short. For example the digital terminal device can be located in the same exchange, or even within the same component group, as the circuitry belonging to the analog junction line VL. Such an arrangement is described hereinafter, together with the mode of operation of the entire circuit arrangement, with reference to some examples of its particular structures and functions.

Assuming, for example that a connection request signal arrives via the analog junction line VL, the signal is first recognized by the particular line interface LS in service, and reported over the control line bundle STB to the control device SE. A digital report then is generated and the digital terminal interface DAS is directed to transmit an engagement report to the digital terminal device coupled along the signaling channel D. Additionally, the digital signal processor is enabled and commences receiving and evaluating acoustic frequency signals arriving via the junction line VL. If the signals involve audio frequency selection information, this condition is recognized digitally by the digital signal processor DSP and signaling reports are compiled in each case in cooperation with the control device SE. The signalling reports are sent to the digital terminal device via the digital terminal interface DAS.

If the digital terminal device on the exchange confirms the status of a desired subscriber connection, then corresponding reports are received from the terminal device, at the signaling channel D. The reports are received by the digital terminal interface DAS and passed on to the control device SE. Then the signal processor DSP is ordered to generate the corresponding audio frequencies digitally so that an audio frequency signal is emitted as a free or busy signal via the converter circuits COFI.

Assuming a particular subscriber of the digital exchange coupled to digital connecting line DAL initiates a call, the digital terminal interface DAS receives a corresponding signal at the signaling channel D. Then the control device SE is prompted so that the voice state is set. A corresponding criterion is then broadcast via the line interface LS, the particular criterion depending on the characteristics of the junction line VL. The useful signals exchanged in the voice state are converted from analog to digital or digital to analog via the converter circuits COFI and passed (after or before conversion, respectively) through the signal processor DSP. The digital signals are exchanged between the signal processor DSP and the terminal interface DAS and carried over in both directions via the digital connecting line DAL on a useful data channel B. The digital signal processor DSP monitors information passing through and is capable of recognizing if signaling codes in the form of audio frequencies arrive via the analog junction line VL. In this manner, for example, the status of the connection can be changed. In addition, receiver circuits are operable in the line interface LS to recognize a DC signal which, for example, signals the termination of a voice connection. In this case a code is generated in cooperation with the control device SE which is sent out to the digital connecting line DAL in a form which will be recognized by a particular digital terminal device coupled along the signaling channel D.

A connection made through the digital exchange which is to involve ongoing occupancy of a junction line VL is recognized when a corresponding report is received from the digital terminal interface DAS via the signaling channel D. This report is passed on to the control device SE which generates a switch command which is sent to the line interface LS via the control line bundle STB. From there an occupancy indication or criterion is formed. For example, occupancy can be set up and maintained by forming a direct current loop. The signal processor DSP is set in reception readiness so that selection request signals coming in because of the occupancy code can be recognized. Response or receipt signals coming in via the analog junction line VL are recognized and processed depending on their type either by the line interface LS or by the digital signal processor DSP.

The codes received in this junction state via the junction line VL are sent in the correspondingly transformed (digitized) command form to the control device SE which causes the digital terminal interface DAS to emit a corresponding signaling report on the signaling channel D via the digital connecting line DAL. Status selection information (e.g., addressing) necessary in the case of an outgoing connection is received via the signaling channel D and passed on to the control device SE by the digital terminal interface. According to the characteristics of the particular junction line VL, either direct current interruptions can be generated in impulse form by the line interface LS, or audio frequency selection (e.g., addressing) signals can be generated by a multifrequency process (e.g., DTMF) by the digital signal processor DSP. The audio tones are sent out via the audio pathway after conversion to analog. Also incoming criteria arriving via the analog junction line VL after the completion of the selection process are, depending on their nature, received by the line interface LS or by the signal processor DSP and passed on via the control line bundle STB to control device SE. Then the digital terminal interface DAS is caused to send out the appropriate signaling word in each case via the digital connecting line DAL. If in this way the digital junction line VL receives a report criterion, the voice connection is thus brought about.

During an existing voice connection, the digital signal processor DSP preferably is operable to distinguish those component parts of the useful signal sent which are returned due to reflection from the hybrid connection GA. The signal processor DSP compensates for the detected reflection so that the function of an adaptive hybrid connection is achieved.

The reception level of the incoming digitized useful signal is evaluated in each case and can be amplified in accordance with requirements in such a way that a normalized high level is created in the digitized data. In the opposite direction, the transmitting amplifier can be so adjusted from the signal processor DSP within the amplifier arrangement V, to provide a predetermined output level.

Depending on the number of junction lines $VL_1$-$VL_n$ which are assigned to a control device SE and a signal processor DSP, numerous useful data channels B are formed by the digital terminal interface DAS. Generally one signaling channel D is sufficient to handle the traffic of several junction lines VL. The number of useful data channels B and signaling channels D also depends on what type of digital device or devices are coupled to the digital exchange. If the number of junction lines VL requires additional useful data channels B than are available with one digital connecting line DAL because of the type of terminal device in the digital exchange, then it is also possible to connect several digital connecting lines DAL to the digital terminal interface DAS.

The invention as discussed herein is a circuit arrangement for conversion of signals and information between analog junction lines $VL_1$-$VL_n$ and digital terminal devices in communications exchanges, wherein decentralized control devices SE are provided in order to process and pass on switching criteria and codes received and sent to the respective analog junction line VL, inside and outside the audio frequency band. The circuit arrangement comprises a plurality of line interfaces $LS_1$-$LS_n$, each coupled directly to a respective one of the decentralized control devices SE, for the switching criteria and codes to be exchanged outside of the audio frequency. At least one digital signal processor DSP is provided for the codes to be exchanged within the audio frequency band, the digital signal processor DSP being looped in via a hybrid connection GA and converter COFI in a speech path which cooperates with the control device SE. A digital terminal interface DAS is responsive to the control device SE and the signal processor DSP, the digital terminal interface DAS being modulated by the control device SE and the signal processor DSP to provide a plurality of useful channels B and at least one signaling channel D.

Audio tones and audio frequency selection information arriving on the speech path from the analog junction line VL are received and evaluated by the signal processor DSP and are passed via a control line bundle STB to the control device SE. The control device SE is operable to convert the audio tones and audio frequency selection to information for processing through the terminal interface DAS. Preferably, the audio tones and selection information sent by the speech path to the junction line VL are generated in digital form by the signal processor DSP as a function of setting commands generated by the control device SE when corresponding criteria are received via the terminal interface DAS. During transmission of audio signals, at least one of simple audio tones, audio tone sequences, pieces of music and statements are selectable and are defined by parameters stored and accessible via the signal processor DSP.

The signal processor DSP can be operable to compensate for a reflected signal originating from a transmitted signal and thus digitally simulates an adaptive hybrid connection. Amplifiers V are coupled between the hybrid connection GA and converter circuits COFI. The circuit arrangement is operable, after compensation for the reflected signal by adjustment of the hybrid connection GA by the signal processor DSP, to provide a level evaluation of a received signal and to generate a control criterion STV whereby the amplifiers are modulated. The signal processor DSP can be programmable for adjusting a level of a transmitted signal to standardized values.

The invention having been disclosed, variations and modifications within the intendment of the invention will now become apparent to persons skilled in the art. Reference should be made to the appended claims rather than the foregoing specification in order to assess the scope of the invention in which exclusive rights are claimed.

We claim:

1. A circuit arrangement for conversion of signals and information between analog junction lines and digital terminal devices in communication exchanges, comprising:

a decentralized control device for processing and passing switching criteria and codes received and sent to a respective analog junction line, inside and outside the audio frequency band;

a line interface, coupled directly to said decentralized control device, for the switching criteria and codes to be exchanged outside the audio frequency;

at least one digital signal processor for the codes to be exchanged within the audio frequency band, said at least one digital signal processor being looped in via a hybrid connection and convertor in a speech path which cooperates with said decentralized control device;

a digital terminal interface responsive to said decentralized control device and said at least one digital signal processor, said digital terminal interface being modulated by said decentralized control device and said at least one digital signal processor to provide a plurality of data channels and at least one signalling channel wherein audio tones and audio frequency selection information arriving on said speech path from the analog junction lines are received and evaluated by said at least one digital signal processor and are passed via a control line bundle to said decentralized control device, said decentralized control device being operable to convert the audio tones and audio frequency selection information for processing through said digital terminal interface.

2. The circuit arrangement according to claim 1, wherein the audio tones and selection information sent by the speech path to the analog junction line are generated in digital form by the at least one digital signal processor as a function of setting commands generated by the decentralized control device when corresponding criteria are received via the digital terminal interface.

3. The circuit arrangement according to claim 2, wherein during transmission of audio signals, at least one of simple audio tones, audio tone sequences, pieces of music and statements are selectable and are defined by parameters stored and accessible via the at least one digital signal processor.

4. The circuit arrangement according to claim 1, wherein the at least one digital signal processor is operable to compensate for a reflected signal originating from a transmitted signal and thus digitally simulates an adaptive hybrid connection.

5. The circuit arrangement according to claim 4, further comprising amplifiers coupled between the hybrid connection and converter circuits, and wherein the circuit arrangement is operable, after compensation for the reflected signal by adjustment of the hybrid connection by the at least one digital signal processor, to provide a level evaluation of a received signal and to generate a control criterion whereby the amplifiers are modulated.

* * * * *